United States Patent
Ciurea et al.

(10) Patent No.: US 7,551,401 B1
(45) Date of Patent: Jun. 23, 2009

(54) OFFSET LIMITER FOR DISK DRIVE SUSPENSION

(75) Inventors: Cornel Ciurea, Murrieta, CA (US); Robert Golightly, Perris, CA (US); Koji Iwamoto, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 310 days.

(21) Appl. No.: 11/246,553

(22) Filed: Oct. 6, 2005

(51) Int. Cl.
G11B 21/16 (2006.01)

(52) U.S. Cl. .................................. 360/245.7

(58) Field of Classification Search ........................ None
See application file for complete search history.

(56) References Cited

U.S. PATENT DOCUMENTS

| | | | |
|---|---|---|---|
| 5,526,205 A | 6/1996 | Aoyagi et al. | |
| 5,771,136 A | 6/1998 | Girard | |
| 5,815,349 A | 9/1998 | Frater | |
| 5,838,517 A | 11/1998 | Frater et al. | |
| 5,930,079 A | 7/1999 | Vera et al. | |
| 5,930,080 A | 7/1999 | Frater et al. | |
| 5,959,807 A | 9/1999 | Jurgenson | |
| 5,987,733 A | 11/1999 | Goss | |
| 6,021,022 A | 2/2000 | Himes et al. | |
| 6,046,883 A | 4/2000 | Miller | |
| 6,067,209 A | 5/2000 | Aoyagi et al. | |
| 6,069,773 A | 5/2000 | Frater et al. | |
| 6,137,657 A | 10/2000 | Coon et al. | |
| 6,147,839 A | 11/2000 | Girard | |
| 6,172,853 B1 | 1/2001 | Davis et al. | |
| 6,181,525 B1 | 1/2001 | Carlson | |
| 6,191,915 B1 | 2/2001 | Takagi et al. | |
| 6,195,237 B1 | 2/2001 | Perez | |
| 6,233,121 B1 * | 5/2001 | Pan ......................... | 360/245.7 |
| 6,243,235 B1 * | 6/2001 | Fu et al. .................. | 360/245.7 |
| 6,266,212 B1 | 7/2001 | Coon | |
| 6,320,729 B1 * | 11/2001 | Coon ....................... | 360/245.7 |
| 6,327,118 B1 | 12/2001 | Perez | |
| 6,367,145 B1 | 4/2002 | Coon et al. | |
| 6,373,664 B1 | 4/2002 | Coon et al. | |
| 6,388,843 B1 | 5/2002 | Takagi et al. | |
| 6,417,986 B1 | 7/2002 | Tran et al. | |
| 6,417,996 B1 * | 7/2002 | Budde ..................... | 360/245.7 |
| 6,424,498 B1 * | 7/2002 | Patterson et al. ......... | 360/245.7 |
| 6,426,851 B1 | 7/2002 | Perez | |
| 6,445,546 B1 * | 9/2002 | Coon ....................... | 360/245.7 |
| 6,504,684 B1 | 1/2003 | Danielson et al. | |
| 6,533,950 B1 | 3/2003 | Shum et al. | |
| 6,549,372 B1 | 4/2003 | Chen et al. | |
| 6,549,375 B1 | 4/2003 | Crane et al. | |
| 6,560,074 B2 | 5/2003 | Gillis et al. | |
| 6,587,309 B2 | 7/2003 | Nojima | |
| 6,667,856 B2 * | 12/2003 | Danielson et al. ........ | 360/244.8 |
| 6,714,386 B1 | 3/2004 | Polycarpou et al. | |

(Continued)

*Primary Examiner*—Mark Blouin
(74) *Attorney, Agent, or Firm*—Intellectual Property Law Offices of Joel Voelzke, APC (57) ABSTRACT

A disk drive suspension assembly employing an offset limiter for allowing bending of a flexure with respect to a load beam after joining the two. The assembly comprises a baseplate, a load beam and a flexure, the load beam including one or more engagement surfaces, and the flexure including a U-shaped limiter. The U-shaped limiter includes two substantially parallel legs and a distal end. The distal end includes a portion offset from the plane defined by the two legs. The offset portion increases the clearance between the distal end and the engagement surfaces and eliminates the interference therebetween during the bending of the U-shaped limiter.

26 Claims, 7 Drawing Sheets

U.S. PATENT DOCUMENTS 6,791,798 B1    9/2004   Mei
6,995,953 B2 *  2/2006   Mahoney et al. ......... 360/245.7
7,298,590 B1   11/2007   Mei 2002/0075602 A1 *  6/2002  Mangold et al. ......... 360/245.7
2003/0086207 A1    5/2003  Watadani et al.
2005/0180052 A1 *  8/2005  Suzuki et al. ............ 360/245.7

* cited by examiner

OFFSET LIMITER FOR DISK DRIVE SUSPENSION

BACKGROUND

1. Field of the Invention

The present invention relates, in general, to suspension systems for shock absorption. More specifically, the present invention relates to methods for manufacturing a disk drive suspension, the disk drive suspension employing an offset limiter.

2. Related Art

A disk drive suspension, present in a disk drive head suspension assembly, comprises a load beam and a flexure. The flexure is a single-piece substantially planar component when manufactured. The flexure comprises a U-shaped limiter. The U-shaped limiter includes a distal end. The load beam includes one or more tongues extending in a substantially longitudinal direction. The U-shaped limiter is bent at about 90 degrees to the flexure plane to deploy the distal end in a position such that the distal end of the bent U-shaped limiter and a tongue on the load beam engage, in conditions of shock, to prevent any damage to the disk drive suspension assembly.

Under the condition of no load, engaged distance (the horizontal distance between an extreme end of the tongue, and the line of engagement of the tongue with the distal end of the U-shaped limiter, in conditions of shock) and limiter height (the vertical distance between the tongue and the surface of the distal end of the bent U-shaped limiter, under no-load condition) should be configured at appropriate values for the optimum performance of the disk drive suspension. Typically, the values for the engaged distance and the limiter height are 0.004 inches and 0.002 inches, respectively.

In the current state of art, during the process of manufacturing a disk drive suspension, the U-shaped limiter is bent before coupling the load beam and the flexure. The load beam and the flexure require adjustment before the coupling, to configure the engaged distance and the limiter height at required values. This adjustment increases the time required for the coupling and decreases the overall productivity of the manufacturing process, and therefore, the units per hour (UPH) of the disk drive suspensions manufactured are less. Further, if the U-shaped limiter is bent after the coupling of the load beam and the flexure, it is not possible to maintain the engaged distance and the limiter height at appropriate values required for the optimum performance of the disk drive suspensions.

In light of the foregoing, there is a need for a method for manufacturing a disk drive suspension system, which minimizes the time consumed in the adjustments of the components and increases the overall productivity.

SUMMARY

Various embodiments of the present invention provide methods for manufacturing a disk drive head assembly, the disk drive head assembly including an offset limiter. A suspension system for a disk drive head assembly includes a baseplate, a load beam and a substantially planar flexure. In accordance with a first embodiment of the invention, the load beam is coupled to the baseplate, and the flexure is coupled to the load beam. The load beam provides one or more engagement surfaces, and the flexure provides a U-shaped limiter, the U-shaped limiter being displaced from the one or more engagement surfaces. In one embodiment of the present invention, the U-shaped limiter is integral to the flexure. The U-shaped limiter includes two substantially parallel legs extending in a direction substantially normal to the flexure plane and a distal end extending between the legs. The distal end includes an offset portion, which is offset from the plane defined by the legs. The load beam and the flexure are so configured that the distal end of the U-shaped limiter is in close proximity to the one or more engagement surfaces on the load beam. Upon application of a shock force increasing from zero, the distal end engages at one engagement surface.

During the manufacturing of the suspension system, the load beam and the flexure are coupled before the bending of the U-shaped limiter. In accordance with various embodiments of the invention, the offset portion helps to bend the U-shaped limiter after the coupling of the flexure and the load beam. The distal end with the offset portion provides more clearance between the distal end and the one or more engagement surfaces than the clearance provided by the distal end without an offset portion. Accordingly, the interference between the one or more engagement surfaces and the distal end does not occur while the U-shaped limiter is being bent. With the absence of the interference, the bending of the U-shaped limiter is possible even after the load beam and the flexure have been coupled. In one implementation, the U-shaped limiter is bent from about an angle of zero degrees with respect to the flexure plane, to an angle of about 90 degrees with respect to the flexure plane.

In accordance with one embodiment of the invention, the offset portion is a V-shaped form. In another embodiment, the offset portion is an arc-shaped form. In still another embodiment, the offset portion is a U-shaped form.

In one implementation, a load beam is a substantially planar component extending in a substantially longitudinal direction with respect to the baseplate. The load beam includes a first longitudinal edge, a second longitudinal edge, one or more transverse members, and one or more hollow areas. The first longitudinal edge and the second longitudinal edge extend in a substantially longitudinal direction from an extreme end of the baseplate. Further, the first longitudinal edge and the second longitudinal edge are separated by the one or more transverse members. The transverse members, the first longitudinal edge, and the second longitudinal edge form borders for the one or more hollow areas. In one embodiment, at least one engagement surface on the load beam includes a tongue extending in a substantially longitudinal direction from a transverse member of the load beam, into a hollow area. The flexure is a substantially planar structural element extending in a substantially longitudinal direction with respect to the baseplate. The flexure comprises one or more hollow areas.

In accordance with various other embodiments of the invention, a disk drive suspension includes a substantially planar load beam and a flexure. The load beam includes a U-shaped engager. The structure of the U-shaped engager is similar to the structure of the U-shaped limiter. In one embodiment of the present invention, the U-shaped engager is integral to the load beam. The U-shaped engager includes two substantially parallel legs and a distal end. The two legs extend in a substantially normal direction to the load beam plane. The distal end extends between the two legs. The distal end includes a portion offset from the plane defined by the two legs. The flexure includes one or more limiting surfaces. In one embodiment of the invention, the one or more limiting surfaces may be formed as integral elements to the flexure. The load beam and the flexure are so configured that the distal end of the U-shaped engager is in close proximity to the one or more limiting surfaces on the flexure. Upon application of a shock force increasing from zero, the distal end engages at one limiting surface. In one embodiment, at least one limiting surface includes a tongue extending from the flexure into one hollow area in a substantially longitudinal direction.

During the manufacturing of the disk drive suspension, coupling of the flexure to the load beam is performed before the bending of the U-shaped engager on the load beam. The offset portion helps to bend the U-shaped engager after the coupling of the load beam and the flexure. In one embodiment, the offset portion is a V-shaped form. In another embodiment, the offset portion is an arc-shaped form. In still another embodiment, the offset portion is a U-shaped form. In one implementation, the U-shaped engager is bent from about an angle of zero degrees with respect to the load beam plane to an angle of about 90 degrees with respect to the load beam plane.

One object of the invention is to provide an improved manufacturing process for a disk drive head assembly. Another object is to provide an offset limiter in a suspension system, such that bending of the offset limiter may be performed after the assembly of a load beam and a flexure in the suspension system.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

Preferred embodiments of the invention will hereinafter be described in conjunction with the appended drawings provided to illustrate and not to limit the invention. The components in the figures are not necessarily to scale, emphasis instead being placed upon illustrating the principles of the invention. In the figures, like reference numerals designate corresponding parts throughout the different views.

FIG. 2b shows a cross-sectional view of a portion of the U-shaped limiter of FIG. 2a, as viewed along lines A-A of FIG. 2a.

DETAILED DESCRIPTION

The present invention relates to an offset limiter for improving the process of manufacturing or assembling a disk drive head suspension assembly or a head gimbal assembly. The improved process described herein increases productivity by minimizing the time consumed in adjusting components of the disk drive head suspension assembly or the head gimbal assembly.

In accordance with various embodiments of the invention, a disk drive suspension includes a baseplate, a load beam, and a flexure. At its proximal end, the baseplate is attached to an actuator arm. The load beam is coupled to the baseplate, and the flexure is coupled to the load beam. The present invention focuses primarily on configuring the load beam and the flexure for improving the process of assembly of the baseplate, the load beam, and the flexure.

In accordance with various embodiments of the invention, the load beam provides one or more engagement surfaces. In one embodiment, at least one engagement surface includes a tongue extending in a substantially longitudinal direction from a transverse member into one hollow area of the beam.

In accordance with various embodiments of the invention, the flexure also includes a U-shaped limiter. The U-shaped limiter includes two substantially parallel legs and a distal end. The two legs extend in a substantially normal direction to the flexure plane. The distal end extends between the two legs. The distal end includes a portion offset from the plane defined by the two legs. In one embodiment of the invention, the offset portion comprises a V-shaped form.

In accordance with various embodiments of the invention, the offset portion on the distal end helps to bend the U-shaped limiter after the coupling of the flexure and the load beam. The distal end with the offset portion provides more clearance between the distal end and the one or more engagement surfaces than the clearance provided by the distal end without an offset portion. Accordingly, interference otherwise encountered when bending the U-shaped limiter to a position surrounding the engagement surface tongue is eliminated. With the elimination of this interference, the bending of the U-shaped limiter is possible even after the coupling of the load beam and the flexure. This simplifies and improves the assembly process.

Figure 1:
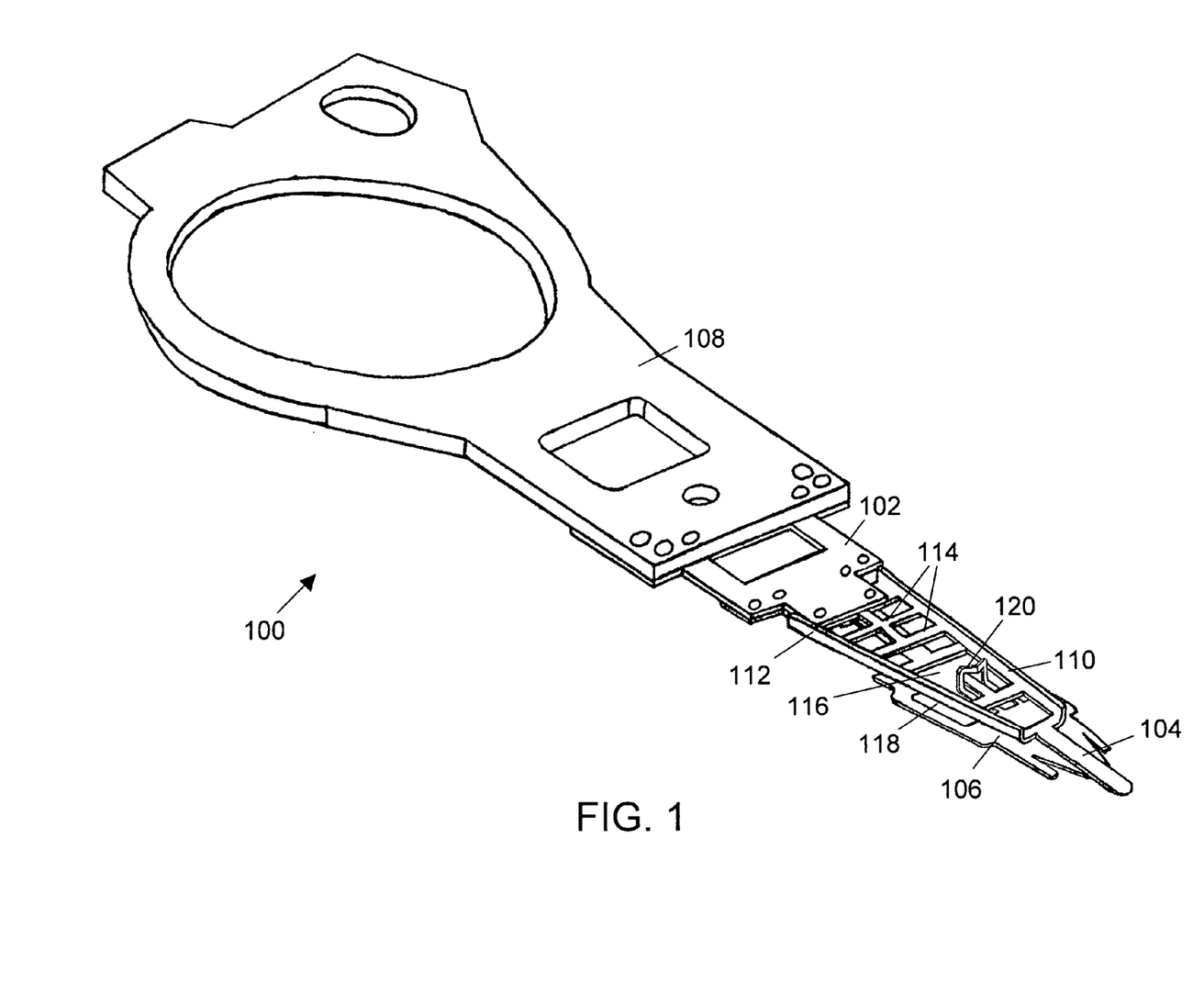
FIG. 1 shows an oblique view of one embodiment of a disk drive suspension according to the present invention.

With reference to the drawings in detail, FIG. 1 shows an oblique view of a disk drive suspension 100, in accordance with one embodiment of the invention. Disk drive suspension 100 includes a baseplate 102, a load beam 104, and a flexure 106. Baseplate 102 is attached to an actuator arm 108. Load beam 104 is coupled to baseplate 102. Flexure 106 is coupled to load beam 104. Load beam 104 comprises a substantially planar structural element and extends in a substantially longitudinal direction with respect to baseplate 102. Load beam 104 includes a first longitudinal edge 110, a second longitudinal edge 112, one or more transverse members 114, and one or more hollow areas 116. First longitudinal edge 110 and second longitudinal edge 112 extend from an extreme end of baseplate 102 in a substantially longitudinal direction with respect to baseplate 102. First longitudinal edge 110 and second longitudinal edge 112 include a portion that curves vertically in a direction normal to the load beam plane, as shown, for added stiffness of the load beam. One or more transverse members 114 separate first longitudinal edge 110 and second longitudinal edge 112. Transverse members 114, first longitudinal edge 110, and second longitudinal edge 112 together form borders for one or more hollow areas 116.

Flexure 106 comprises a substantially planar structural element and extends in a substantially longitudinal direction with respect to baseplate 102. Flexure 106 includes at least one hollow area 118 and a U-shaped limiter 120. U-shaped limiter 120 extends into one hollow area, in a direction substantially normal to the flexure plane.

Figure 2A:
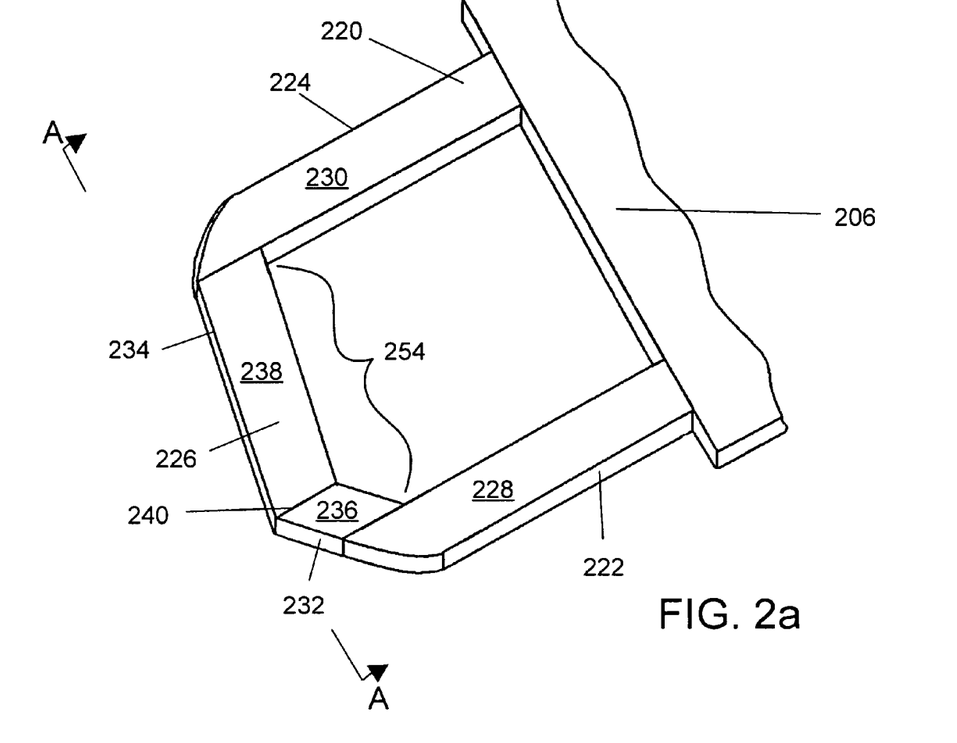
FIG. 2a shows an oblique, fragmentary view of one embodiment of a flexure, according to the present invention, with a U-shaped limiter on the flexure.

FIG. 2a shows an oblique, fragmentary view of one embodiment of a flexure 206 having a U-shaped limiter 220, according to the present invention. U-shaped limiter 220 includes a first leg 222, a second leg 224, and a distal end 226. First leg 222 extends substantially parallel to second leg 224. First leg 222 includes a first leg surface 228. Second leg 224 includes a second leg surface 230. Distal end 226 extends between first leg 222 and second leg 224. Distal end 226 includes an offset portion 254, the offset portion 254 being offset from a plane defined by first leg 222 and second leg 224. In the embodiment of the invention shown in FIG. 2a, offset portion 254 comprises a substantially V-shaped form. In various other embodiments of the invention, offset portion 254 of distal end 226 may comprise various other shapes. For example, in alternate embodiments of the invention, offset portion 254 may comprise a rectangular or circular arc or U-shape or some other elliptical or parabolic arc. Those skilled in the art will readily see that many other embodiments of this invention are possible, which employ a distal end having an offset portion.

In the embodiment illustrated in FIG. 2a, distal end 226 includes a first element 232 and a second element 234. First element 232 and second element 234 extend between first leg 222 and second leg 224, at an angle with respect to the plane defined by first leg 222 and second leg 224. First element 232 and second element 234 form V-shaped offset portion 254 of distal end 226. First element 232 includes a first element surface 236. Second element 234 includes a second element surface 238. First element surface 236 meets second element surface 238 at a location 240.

Configuring an offset portion in a distal end of a U-shaped limiter advantageously provides greater clearance between the distal end of the limiter rotating into a position surrounding one or more engagement surfaces on a load beam. The difference in clearances is the maximum vertical distance between the top surface of the distal end configured with an offset portion, and the top surface of the distal end not configured with an offset portion.

Figure 2B:
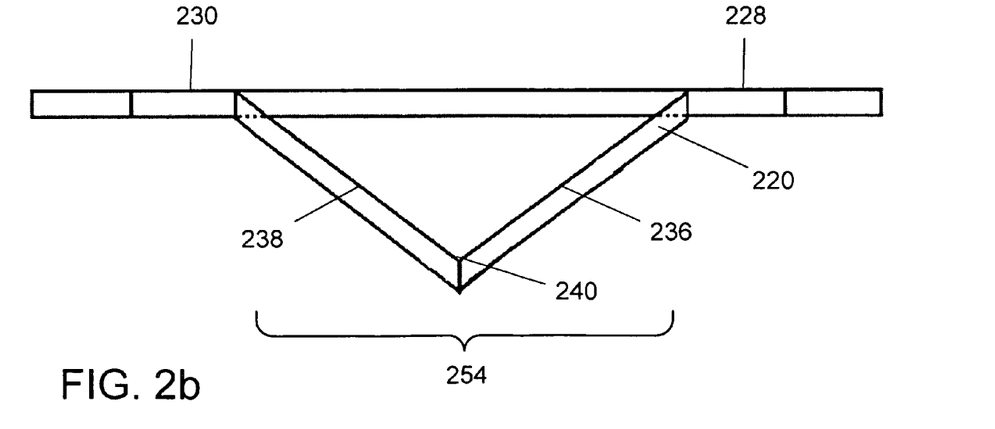

FIG. 2b shows a cross-sectional view of a portion of U-shaped limiter 220 of FIG. 2a, as viewed along lines A-A of FIG. 2a. In this embodiment of the invention, the clearance difference between one or more engagement surfaces on a load beam (not shown) and the distal end offset portion 254, and between the one or more engagement surfaces on the load beam and the distal end without an offset portion, is the vertical distance between first leg surface 228 and location 240. In this embodiment, that same clearance difference also exists between second leg surface 230 and location 240.

Figure 3:
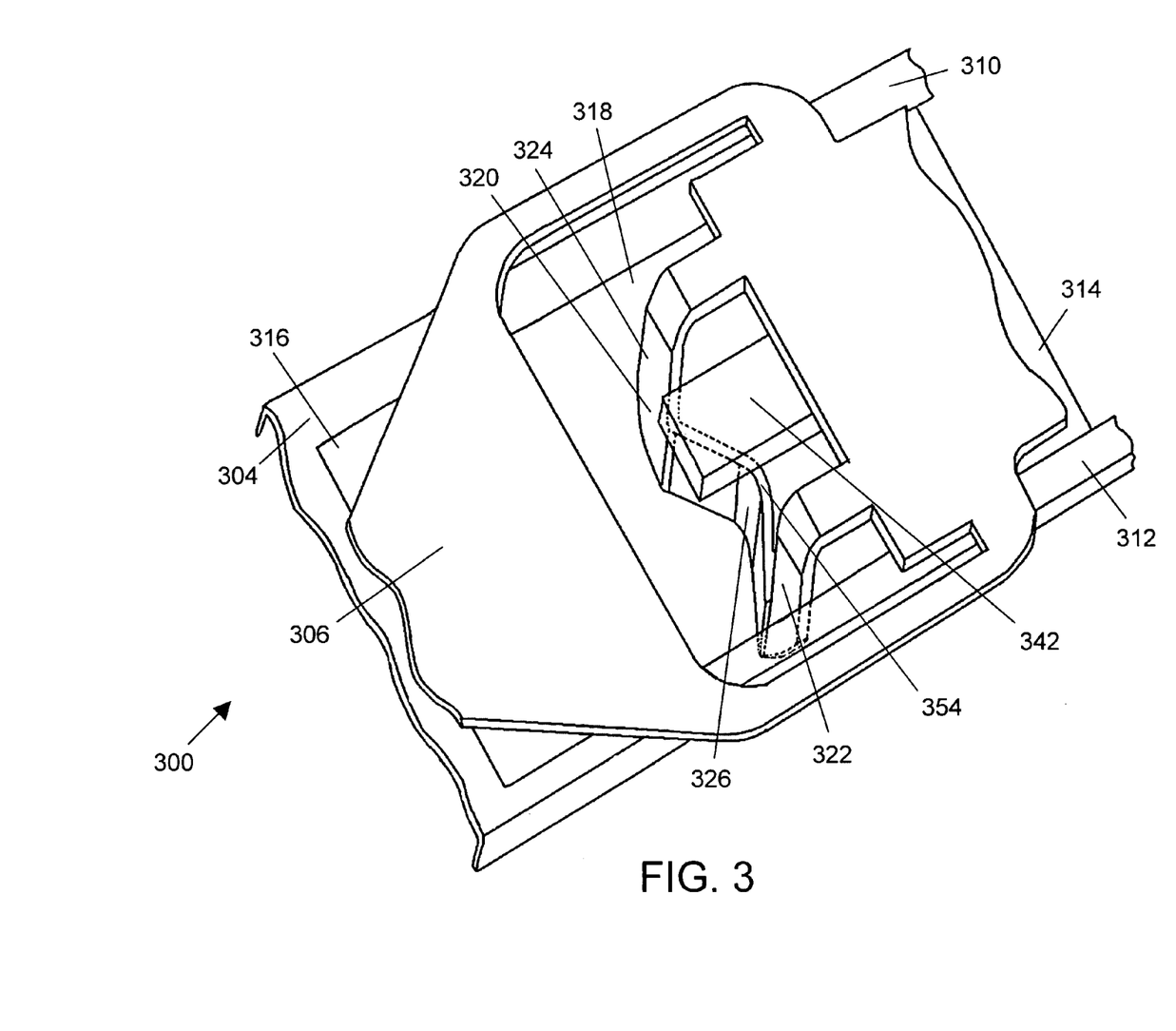
FIG. 3 shows an oblique, fragmentary view of one embodiment of a disk drive suspension according to the present invention, with a U-shaped limiter on a flexure.

FIG. 3 illustrates a disk drive suspension 300 according to another embodiment of the invention. FIG. 3 may be considered a magnified view of a part of the embodiment shown in FIG. 1. Disk drive suspension 300 includes a load beam 304 and a flexure 306. Load beam 304 comprises a substantially planar structural element. Flexure 306 comprises a substantially planar structural element extending in a direction substantially longitudinal from load beam 304.

Load beam 304 includes a first longitudinal edge 310, a second longitudinal edge 312, a transverse member 314, a hollow area 316 and a tongue 342. Transverse member 314 separates first longitudinal edge 310 and second longitudinal edge 312. Tongue 342 extends from transverse member 314, in a direction substantially normal to transverse member 314. Tongue 342 extends into hollow area 316. Flexure 306 includes a hollow area 318. A U-shaped limiter 320 extends from flexure 306 into hollow area 318. U-shaped limiter 320 includes a first leg 322, a second leg 324, and a distal end 326. First leg 322 extends substantially parallel to second leg 324. Distal end 326 extends between first leg 322 and second leg 324. Distal end 326 includes an offset portion 354, the offset portion 354 being offset from a plane defined by first leg 322 and second leg 324. In the embodiment of the invention shown in FIG. 3, offset portion 354 comprises a V-shaped form. According to various embodiments of the invention, load beam 304 and flexure 306 are configured such that distal end 326 of U-shaped limiter 320 is in close proximity to tongue 342.

During the manufacturing of disk drive suspension 300, flexure 306 is coupled to load beam 304. Thereafter, U-shaped limiter 320 is bent from about an angle of zero degrees with respect to the flexure plane to an angle of about 90 degrees with respect to the flexure plane. The bending of U-shaped limiter 320 is performed after the coupling of load beam 304 and flexure 306.

In accordance with various embodiments of the invention, a distal end should be sufficiently offset from the plane defined by the two substantially parallel legs of a U-shaped limiter so that there is no interference between the distal end and a tongue on the load beam, during the bending of the U-shaped limiter. For example, if a distal end with a flat shape has an interference of 0.001 inch with a tongue on the load beam, during the bending, an offset portion in the distal end should be provided so as to increase the clearance between the distal end and the tongue by at least 0.001 inch. The offset portion eliminates the interference between the distal end and the tongue, enabling the bending of the U-shaped limiter after the coupling of the load beam and the flexure.

Further, for the disk drive suspensions to achieve an optimal level of performance, the engaged distance (under a shock condition) and the limiter height (in an unloaded condition) should be maintained at appropriate values. The engaged distance is measured along the horizontal line of engagement between an extreme end of a tongue on a load beam and the distal end of a bent U-shaped limiter. Limiter height is measured as the vertical distance between the tongue and the surface of the distal end of the bent U-shaped limiter. For example, for an engaged distance of 0.004 inches, a limiter height of 0.002 inches is suitable for optimal performance of a disk drive suspension.

For a given engaged distance, a desired limiter height may be impossible to achieve using a distal end not configured with an appropriate offset, i.e., interference will occur between the distal end and the tongue during the bending of the U-shaped limiter. However, given the same engaged distance, bending a U-shaped limiter having a distal end configured with an offset achieves a limiter height that exceeds the limiter height achieved by bending a distal end not configured with an offset. Therefore, the inclusion of an offset portion on the distal end of the U-shaped limiter enables the bending of the U-shaped limiter without causing interference while maintaining appropriate limiter height and engaged distance. Further, bending the U-shaped limiter may be performed after the coupling of the load beam and the flexure. Moreover, providing an appropriate offset portion on the distal end allows for better manufacturing control over the engaged distance and the limiter height.

Figure 4A:
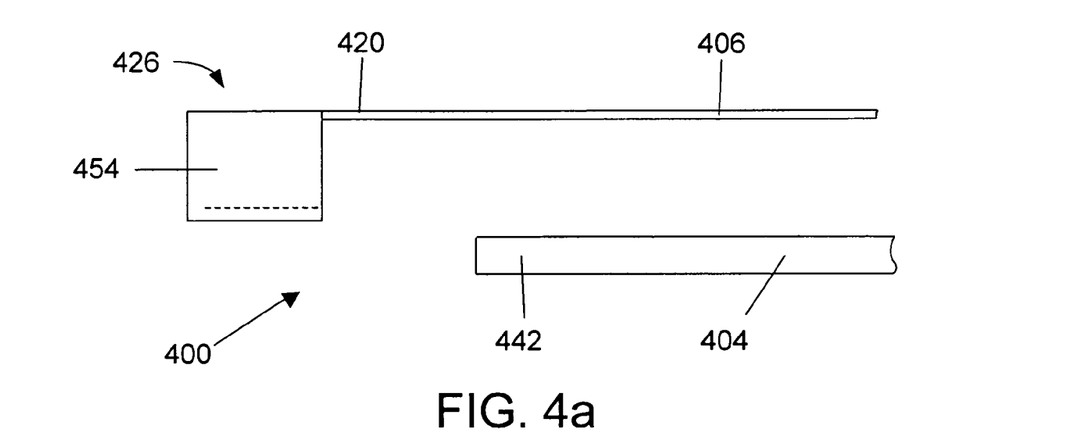
FIGS. 4a, 4b, and 4c illustrate three side views of a part of the disk drive suspension during bending of a U-shaped limiter, according to one embodiment of the present invention.
Figure 4B:
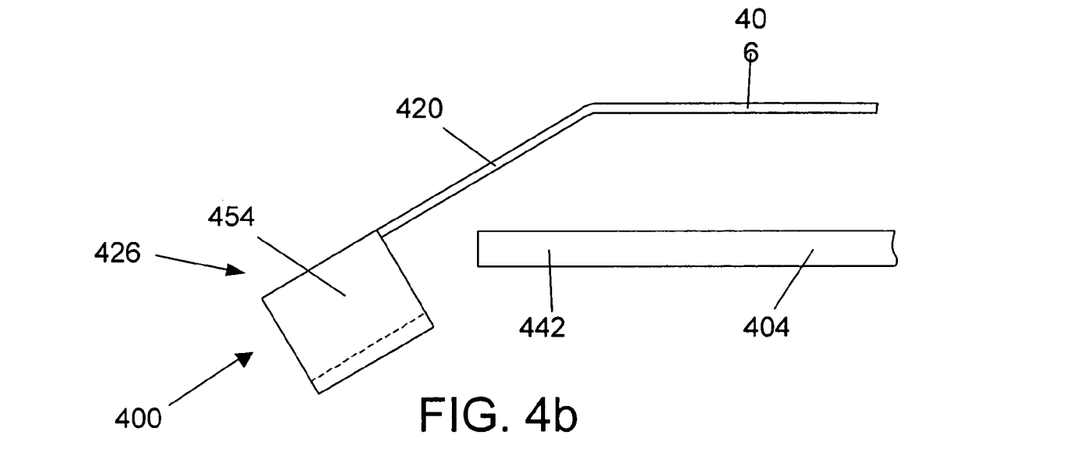
Figure 4C:
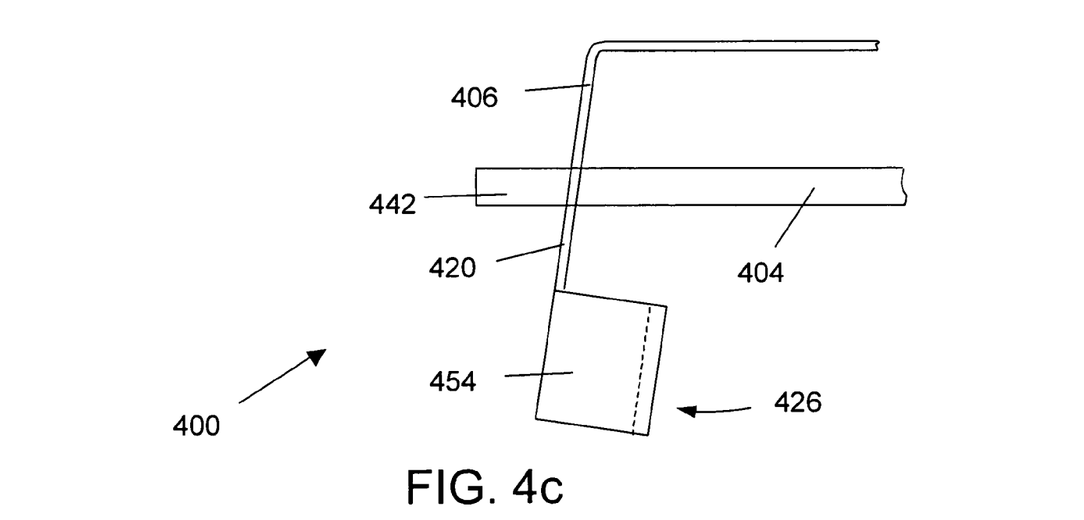

FIGS. 4a, 4b, and 4c illustrate the side views of a part of a disk drive suspension 400 during a fabrication step according to one embodiment of the invention, the step comprising bending a U-shaped limiter 420 to a position surrounding an engagement surface. Disk drive suspension includes a load beam 404 and a flexure 406. Flexure 406 includes U-shaped limiter 420. U-shaped limiter 420 includes a distal end 426 having a V-shaped offset portion 454. Load beam 404 includes tongue 442.

FIG. 4a shows U-shaped limiter 420 at the beginning of the bending operation. Before the bending and during the initial stages of the bending, tongue 442 and distal end 426 are sufficiently separated to provide adequate clearance. As the bending progresses, the clearance between distal end 426 and tongue 442 decreases. FIG. 4b shows U-shaped limiter 420 during an intermediate stage of the bending operation. V-shaped offset portion 454 in distal end 426 facilitates the bending by providing sufficient clearance between distal end 426 and tongue 442. FIG. 4c shows U-shaped limiter 420 near the end of the bending operation. Throughout the operation, clearance between distal end 426 and tongue 442 is maintained by virtue of the offset portion, thereby preventing interference between load beam 404 and flexure 406.

In accordance with various other embodiments of the invention, a substantially planar load beam includes a U-shaped engager. The structure of a U-shaped engager is similar to the structure of a U-shaped limiter. The U-shaped engager includes two substantially parallel legs and a distal end. The two legs extend in a substantially normal direction to the load beam plane. The distal end extends between the two legs. The distal end includes a portion offset from the plane defined by the two legs. In one embodiment of the invention, the offset portion comprises a V-shaped form. The flexure includes one or more limiting surfaces. In one embodiment, at least one limiting surface includes a tongue extending from the flexure into one hollow area in a substantially longitudinal direction. The offset portion helps to bend the U-shaped engager after the coupling of the load beam and the flexure.

Figure 5:
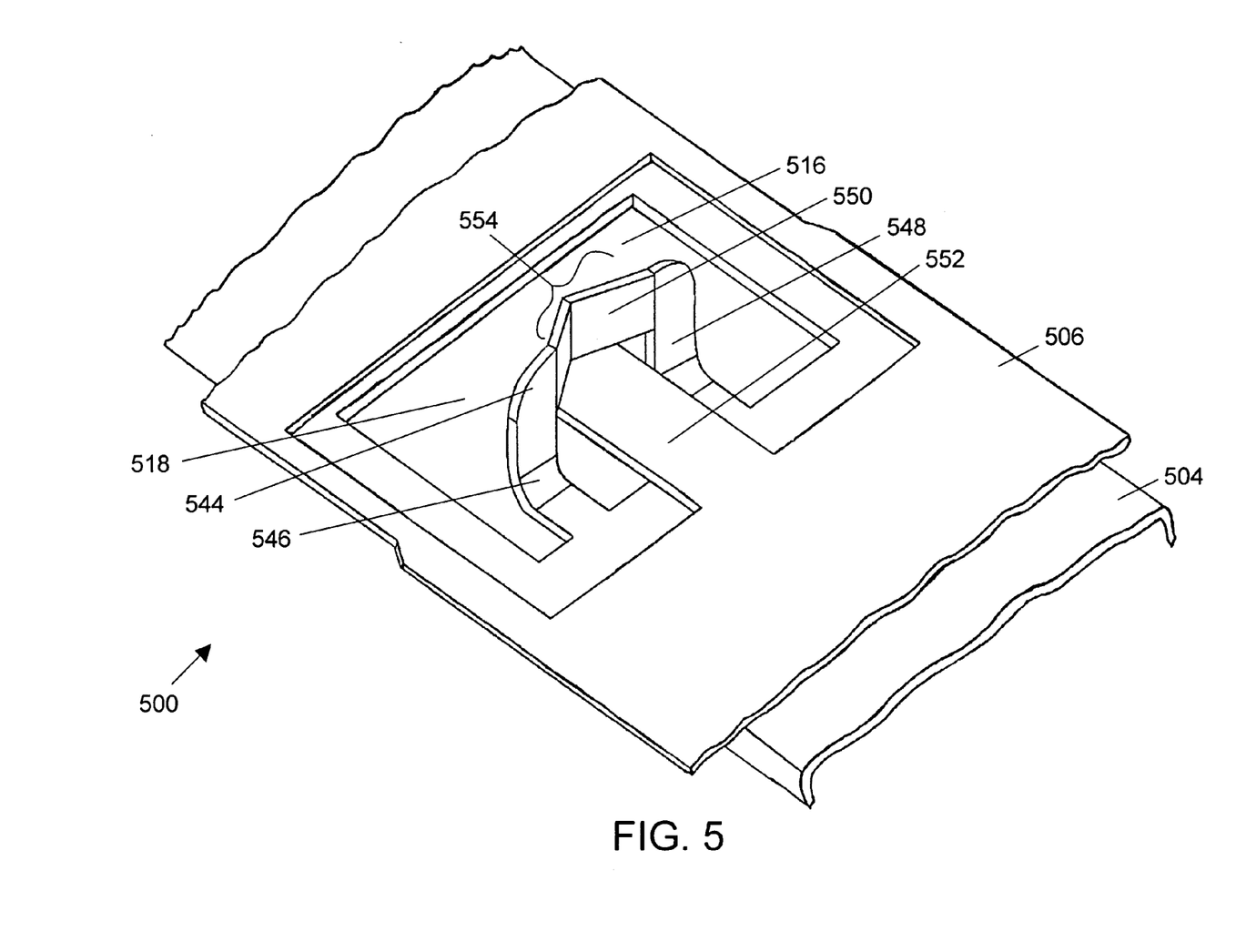
FIG. 5 shows an oblique, fragmentary view of one embodiment of a disk drive suspension according to the present invention, with a U-shaped engager on a load beam.

FIG. 5 shows an oblique, fragmentary view of a disk drive suspension 500 according to one embodiment of the invention. Disk drive suspension 500 includes a load beam 504 and a flexure 506. Load beam 504 comprises a substantially planar structural element extending in a substantially longitudinal direction. Flexure 506 comprises a substantially planar structural element extending in a direction substantially longitudinal from load beam 504.

Load beam 504 includes a U-shaped engager 544 and a hollow area 516. U-shaped engager 544 extends from load beam 504 into hollow area 516. The structural construction of U-shaped engager 544 is similar to a U-shaped limiter, as described in FIG. 2a. U-shaped engager 544 includes a first leg 546, a second leg 548, and a distal end 550. Distal end 550 includes an offset portion 554, the offset portion 554 being offset from a plane defined by first leg 546 and second leg 548. According to the embodiment of the invention shown in FIG. 5, offset portion 554 comprises a V-shaped form. Flexure 506 includes a tongue 552. Tongue 552 extends in the flexure plane in a substantially longitudinal direction from flexure 506. Load beam 504 and flexure 506 are so configured that distal end 550 of U-shaped engager 544 is in close proximity to tongue 552.

As can be seen in FIG. 5 and FIG. 2A, offset portion 554 is made to be offset from the rest of U-shaped engager 544 by a bend in a middle of crosspiece 550, with the bend having a bending axis (bend location 240 in FIG. 2) that is generally vertical and is generally parallel to each of first leg 546 and second leg 548. First crosspiece element surface 236 and second crosspiece element surface 238 in FIG. 2, with bend 240 therebetween, define respective planes that each lie at generally the same angle with respect to the tongue (552 in FIG. 5) as do first leg 222 and second leg 224. The offset is thus defined by a bend 240 in the crosspiece 232/234 such that a central or middle portion of crosspiece 232/234 is displaced longitudinally along the load beam at bend location 240 relative to the outer portions of crosspiece 232/234, which are the end portions of the offset portion, and relative to the distal most portions of legs 222 and 224.

During the manufacturing of disk drive suspension 500, flexure 506 is coupled to load beam 504. Thereafter, U-shaped engager 544 is bent from about an angle of zero degrees with respect to the load beam plane, to an angle of about 90 degrees with respect to the load beam plane. The bending of U-shaped engager 544 is performed after the coupling of load beam 504 and flexure 506.

In accordance with various embodiments of the invention, distal end 550 is sufficiently offset from the plane defined by first leg 546 and second leg 548, so that there is no interference between distal end 550 and tongue 552 during a fabrication step comprising bending of U-shaped engager 544. Therefore, U-shaped engager 544 with distal end 550 is bent after the coupling of load beam 504 and flexure 506 to prevent interference between distal end 550 and tongue 552. The bending of U-shaped engager 544 is similar to the bending of a U-shaped limiter described in FIGS. 4a, 4b, and 4c.

Figure 6:
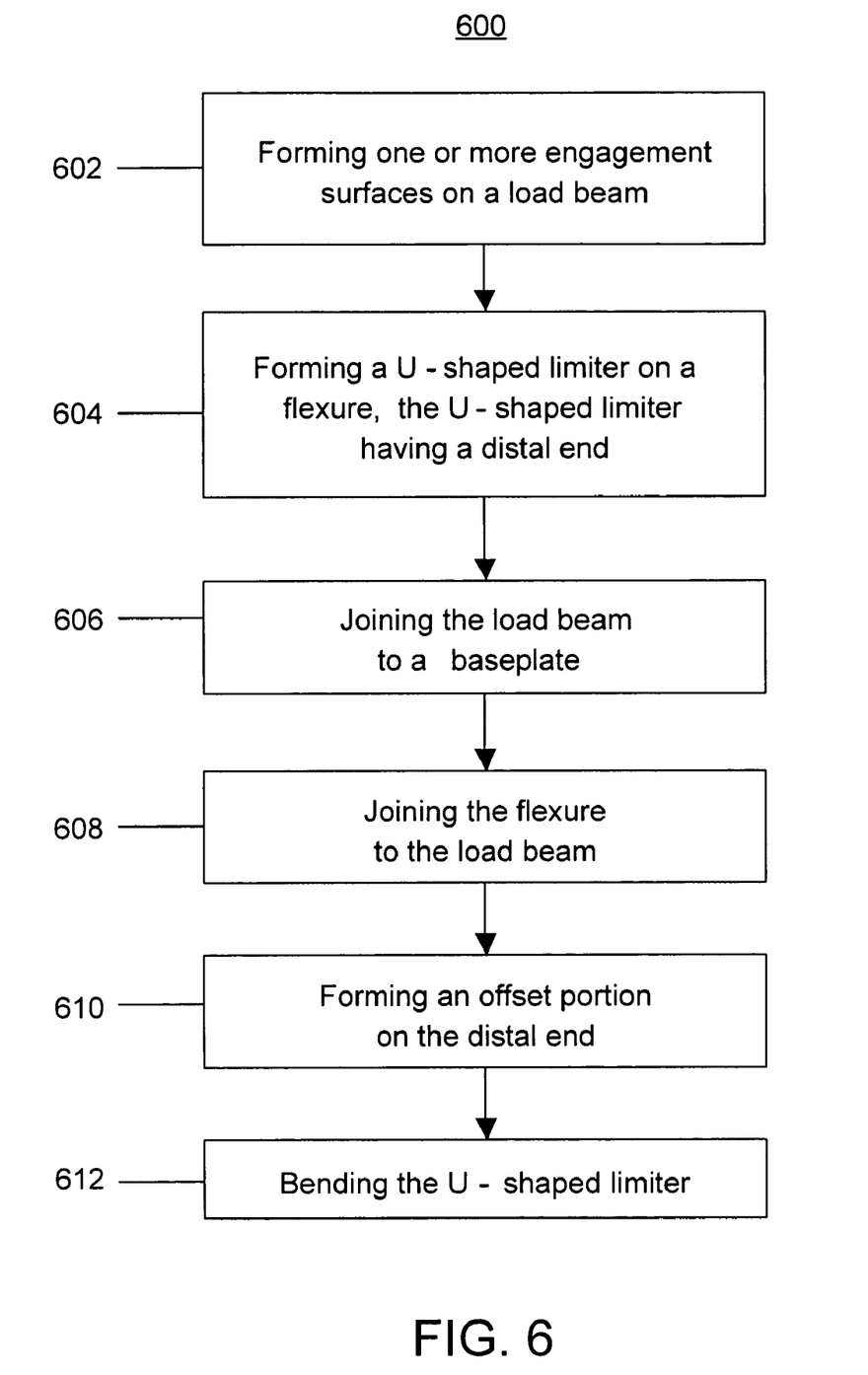
FIG. 6 shows one embodiment of a method for manufacturing a disk drive suspension according to the present invention.

FIG. 6 is a flowchart illustrating one embodiment of a method 600 according to the invention for manufacturing a suspension system for a disk drive head assembly, the assembly comprising a baseplate, a load beam and a substantially planar flexure. The method begins at step 602, which includes forming one or more engagement surfaces on the load beam. In one implementation, the one or more engagement surfaces may comprise one or more tongues attached to a transverse member of the load beam, each tongue extending in a substantially longitudinal direction. In another implementation, the one or more engagement surfaces may be formed as integral elements to the load beam. The next step is step 604. At step 604, a U-shaped limiter is formed on the flexure. The U-shaped limiter includes two parallel legs extending in the flexure plane in a substantially longitudinal direction and a distal end extending between the two legs. The U-shaped limiter is formed to provide sufficient clearance between the U-shaped limiter and the one or more engagement surfaces. The next step 606 comprises joining the load beam and the baseplate. In one implementation, the load beam and the baseplate are joined by welding. The next step 608 comprises joining the flexure and the load beam. In one implementation, the flexure and the load beam are joined by welding. The next step is step 610. At step 610, a portion offset from the flexure plane is formed on the distal end. In one implementation of the invention, the offset comprises a V-shaped form. In other implementations, the offset comprises a circular, rectangular, hyperbolic, or elliptical arc. In still another implementation of the invention, the offset comprises a U-shaped form. The next step 612 comprises bending the U-shaped limiter until the one or more engagement surfaces extend through the U-shaped limiter. This step involves bending of the U-shaped limiter from about zero degrees with respect to the flexure plane to about 90 degrees with respect to the flexure plane, thereby causing the U-shaped limiter to surround the one or more engagement surfaces. The U-shaped limiter is bent to provide a clearance between the U-shaped limiter and the one or more engagement surfaces during and after the bending.

In one embodiment of the invention, the step 610 precedes the steps 606 and 608. In this embodiment, the forming of a portion offset from the flexure plane on the distal end precedes joining the load beam to the baseplate and the subsequent joining of the flexure to the load beam.

Figure 7:
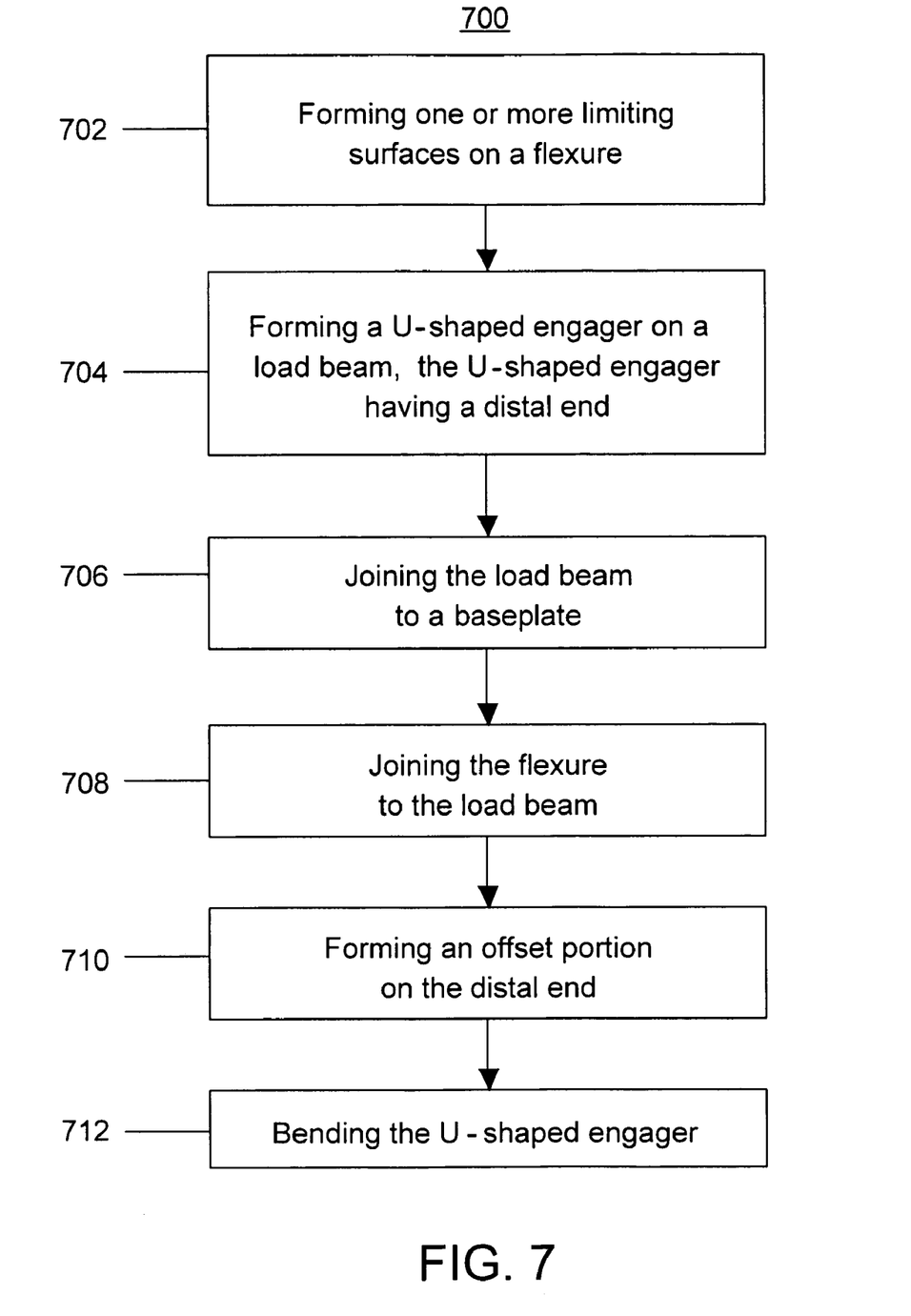
FIG. 7 shows another embodiment of a method for manufacturing a disk drive suspension according to the present invention.

FIG. 7 is a flowchart illustrating one embodiment of a method 700 according to the invention for manufacturing a suspension system for a disk drive head assembly, the assembly comprising a baseplate, a substantially planar load beam, and a flexure. The method begins at step 702, which comprises forming one or more limiting surfaces on the flexure. In one implementation, the one or more limiting surfaces may comprise one or more tongues attached to the flexure, each tongue extending in a substantially longitudinal direction. The next step 704 comprises forming a U-shaped engager on the load beam. The U-shaped engager includes two parallel legs extending in the load beam plane in a substantially longitudinal direction and a distal end extending between the two legs. The U-shaped engager is so formed that there is a clearance between the U-shaped engager and the one or more limiting surfaces. The next step 706 comprises joining the load beam and the baseplate. In one implementation, the load beam and the baseplate are joined by welding. The next step 708 comprises joining the flexure and the load beam. In one implementation, the flexure and the load beam are joined by welding. The next step 710 comprises forming a portion offset from the load beam plane on the distal end. In one implementation of the invention, the offset comprises a V-shaped form. The next step 712 comprises bending the U-shaped engager until the one or more limiting surfaces extend through the U-shaped engager. This step involves bending of the U-shaped engager from about zero degrees with respect to the load beam plane to about 90 degrees with respect to the load beam plane, thereby causing the U-shaped engager to surround the one or more limiting surfaces. The U-shaped engager is so bent to provide a clearance between the U-shaped engager and the one or more limiting surfaces during and after the bending.

In one embodiment of the invention, the step 710 precedes the steps 706 and 708. In this embodiment, the forming of a portion offset from the load beam plane on the distal end precedes joining the load beam to the baseplate and the subsequent joining of the flexure to the load beam.

The various embodiments of the present invention provide a method for increasing the productivity of the manufacturing process of the disk drive suspensions, by providing an offset portion on a limiter or an engager. The offset portion on the limiter or the engager provides better clearance between a distal end of the limiter and engagement surfaces or between a distal end of the engager and the limiting surfaces, during the bending of the limiter or the engager, respectively. This improved design of limiters and engagers facilitates bending of the limiters and engagers, as the case may be, after coupling a load beam and flexure. Moreover, this improved design increases the strength of the limiters or engagers. The improved process of manufacturing enhances productivity and hence increases units per hour output.

While various embodiments of the invention have been illustrated and described, it will be apparent to those of ordinary skill in the art that many more embodiments and implementations are possible that are within the spirit and scope of this invention. Accordingly, the invention is not to be restricted except in light of the attached claims and their equivalents.

What is claimed is:

1. A suspension system for a head gimbal assembly comprising:
   a baseplate;
   a load beam coupled to the baseplate, the load beam comprising one or more engagement surfaces; and
   a substantially planar flexure having a hollow area, the flexure comprising:
      a tongue extending into the hollow area; and
      a U-shaped limiter extending from an edge of the tongue nearest the baseplate, the limiter having a distal end extending between and joining two substantially parallel legs, the distal end being integrally formed with both legs, the legs projecting substantially normally from the flexure plane and the distal end having a portion offset from a plane defined by the legs, the offset being defined by a bend in the distal end, the bend having a bending axis that is generally parallel to each of the two legs, the flexure coupled to the load beam such that the one or more engagement surfaces extend through the U-shaped limiter.

2. The system of claim 1 wherein a clearance between the U-shaped limiter and the one or more engagement surfaces is maintained throughout bending of the U-shaped limiter from an angle of about zero degrees with respect to the flexure plane to an angle of about 90 degrees with respect to the flexure plane.

3. The system of claim 2 wherein the clearance is maintained by virtue of the offset portion.

4. The system of claim 1 wherein at least one engagement surface comprises a tongue projecting from the load beam in a substantially longitudinal direction into a hollow area within the load beam.

5. The system of claim 1 wherein the limiter is integral to the flexure.

6. The system of claim 1 wherein the one or more engagement surfaces are integral to the load beam.

7. The system of claim 1 wherein the offset portion itself comprises a V-shaped form.

8. The system of claim 1 wherein the load beam comprises a first edge and a second edge, the first edge and the second edge extending from the distal end of the baseplate in a substantially longitudinal direction, the first edge and the second edge separated by one or more transverse members, the one or more transverse members, the first edge, and the second edge bordering a hollow area within the load beam, the one or more engagement surfaces extending in a substantially longitudinal direction from a transverse member into the hollow area.

9. The suspension system of claim 1 wherein the offset portion comprises a form selected from the group consisting of a rectangular arc, a circular arc, a U-shape, an elliptical arc, and a parabolic arc.

10. A disk drive comprising the suspension system for a head gimbal assembly of claim 1, a disk in close proximity to the flexure, and a motor to drive the disk.

11. A method of manufacturing a suspension system in a disk drive head assembly comprising a baseplate, a load beam and a substantially planar flexure, the method comprising:
   forming one or more engagement surfaces on the load beam;
   forming a U-shaped limiter on the flexure, the limiter having a distal end extending between and joining two substantially parallel legs, the distal end being integrally formed with the legs;
   joining the load beam to the baseplate;
   joining the flexure to the load beam;
   forming on the distal end a portion offset from the flexure plane, the offset portion itself comprising a V-shaped form; and
   then bending the U-shaped limiter until the one or more engagement surfaces extend therethrough.

12. The method of claim 11 wherein at least one engagement surface comprises a tongue extending from the load beam in a substantially longitudinal direction into a hollow area within the load beam.

13. The method of claim 11 wherein the two substantially parallel legs extend in the flexure plane in a substantially longitudinal direction.

14. The method of claim 11 wherein the step comprising forming the offset portion precedes the joining steps.

15. The method of claim 11 wherein the bending step further comprises bending the U-shaped limiter from an angle of about zero degrees with respect to the flexure plane to an angle of about 90 degrees with respect to the flexure plane.

16. The method of claim 15 wherein a clearance is maintained between the U-shaped limiter and the one or more engagement surfaces throughout the bending step.

17. The method of claim 16 wherein the clearance is maintained by virtue of the offset portion.

18. A load beam for coupling to a flexure in a disk drive head assembly, the load beam attached to a baseplate, the load beam having a hollow area, the load beam comprising:
- a U-shaped engager having a distal end extending between and joining two substantially parallel legs, the distal end integrally formed with the legs, a portion of each leg extending longitudinally into the hollow area; and
- an offset portion on the distal end for engaging one or more surfaces of the flexure during a shock condition, the offset portion extending in a direction normal to a plane defined by the legs, the offset portion having a middle portion that is offset longitudinally along the load beam relative to end portions of the offset portion and relative to the two legs.

19. The load beam of claim 18 wherein the offset portion itself comprises a V-shaped form.

20. A suspension system for a head gimbal assembly comprising the load beam of claim 18 coupled to a flexure.

21. The suspension system of claim 20 wherein a clearance between the U-shaped engager and the one or more engagement surfaces is maintained throughout bending of the U-shaped engager from an angle of about zero degrees with respect to the load beam plane to an angle of about 90 degrees with respect to the load beam plane.

22. The suspension system of claim 20 wherein the one or more surfaces of the flexure comprises a tongue projecting from the flexure in a substantially longitudinal direction into a hollow area within the flexure.

23. A disk drive comprising the suspension system of claim 18, a disk in close proximity to the flexure, and a motor to drive the disk.

24. A suspension comprising a load beam and a flexure, the suspension having a limiter structure for preventing undue travel of a slider attached to the flexure, the limiter structure comprising:
- two legs coupled to at least one of the flexure and the load beam, the legs being in a bent position that is bent upwards into a substantially vertical position about an axis that is lateral to the load beam;
- a tongue coupled to the other of the flexure and the load beam, the tongue extending in a substantially longitudinal direction relative to the load beam;
- a crosspiece connected to the two legs, the crosspiece being bent in a direction normal to a plane of the two legs thereby defining an offset and further defining a substantially vertical bending axis;
- wherein said offset provides sufficient clearance between the crosspiece and the tongue so that the legs can be bent into and out of said bent position without the crosspiece contacting the tongue, and wherein in the absence of said offset said crosspiece would contact said tongue when said legs were bent into and out of said bent position thereby undesirably interfering with bending of said legs into said bent position.

25. The suspension of claim 24 wherein said crosspiece comprises a unitary piece formed integral with said legs, the crosspiece being bent so that a central portion thereof is displaced closer to a proximal end of said tongue than are said legs.

26. A disk drive comprising the suspension system of claim 24, a disk in close proximity to the flexure, and a motor to drive the disk.

* * * * *